United States Patent [19]

Ahmer

[11] Patent Number: 4,646,567
[45] Date of Patent: Mar. 3, 1987

[54] WIND INDICATOR FOR SAILBOAT

[76] Inventor: Carl W. Ahmer, 1321 Hillside Rd., Northbrook, Ill. 60062

[21] Appl. No.: 828,220

[22] Filed: Feb. 10, 1986

Related U.S. Application Data

[63] Continuation of Ser. No. 594,390, Mar. 28, 1984, abandoned.

[51] Int. Cl.<sup>4</sup> ............................................. G01W 1/00
[52] U.S. Cl. ...................................... 73/188; 116/265
[58] Field of Search .................. 73/188, 189; 116/265, 116/274, 273, 275

[56] References Cited

U.S. PATENT DOCUMENTS

| | | | |
|---|---|---|---|
| 477,551 | 6/1892 | Kerr | 73/188 |
| 2,681,569 | 6/1954 | Hirschoff | 73/188 |
| 4,080,826 | 3/1978 | Perretta | 73/188 |

FOREIGN PATENT DOCUMENTS

| | | | |
|---|---|---|---|
| 1403748 | 5/1965 | France | 73/188 |
| 1266814 | 3/1972 | United Kingdom | 73/188 |

*Primary Examiner*—Charles Frankfort
*Assistant Examiner*—Denis E. Corr
*Attorney, Agent, or Firm*—Wood, Dalton, Phillips, Mason & Rowe

[57] ABSTRACT

A wind indicator for a sailboat has a wind vane on a vertical shaft which is mechanically coupled with a horizontal shaft turning a pointer. The wind angle relative to the boat is indicated by the pointer on a circular dial. Two windward pointing indicators are mounted from the mast. A reaching wind indicator is mounted at the stern.

14 Claims, 10 Drawing Figures

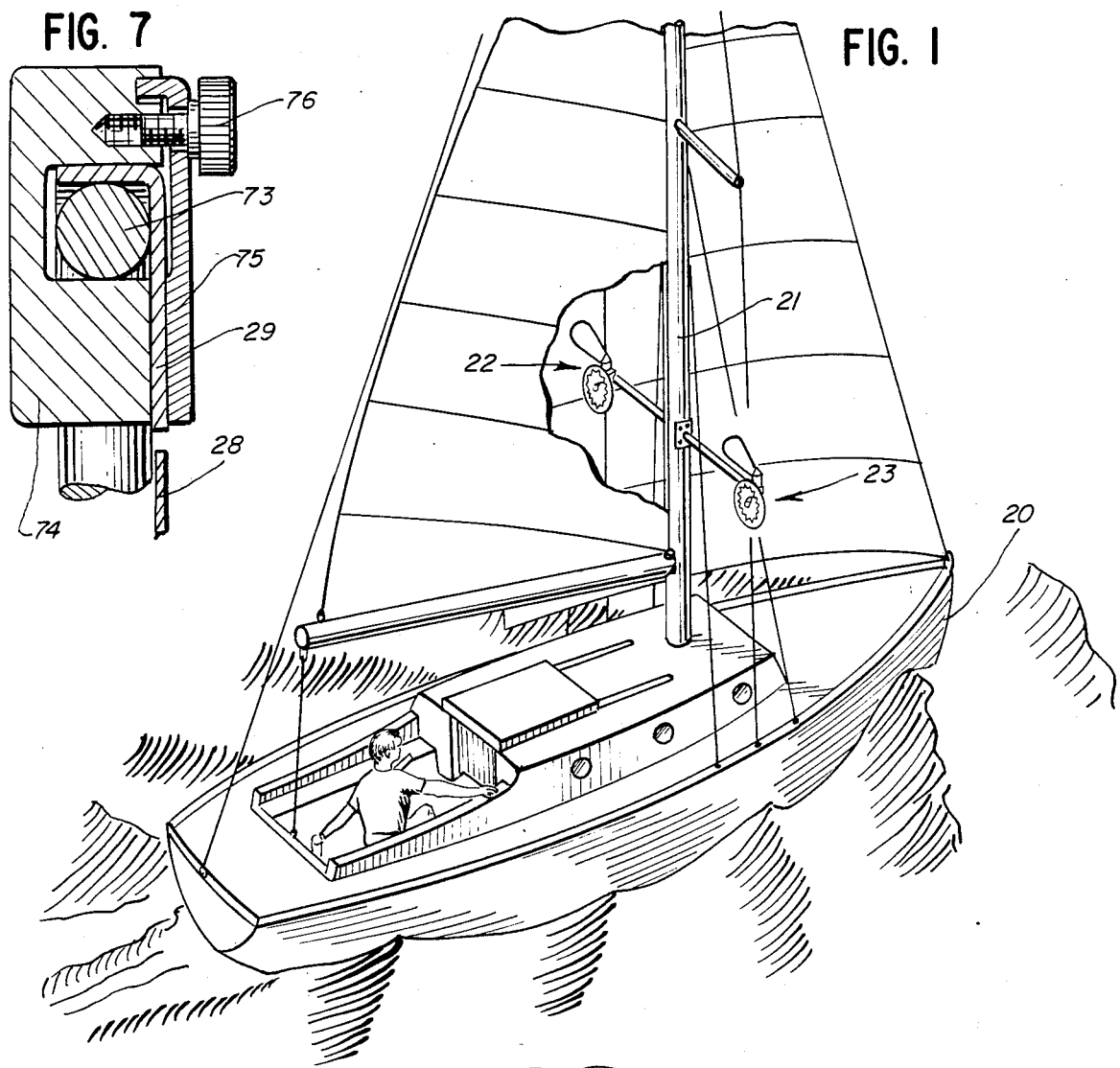
FIG. 7
FIG. 1
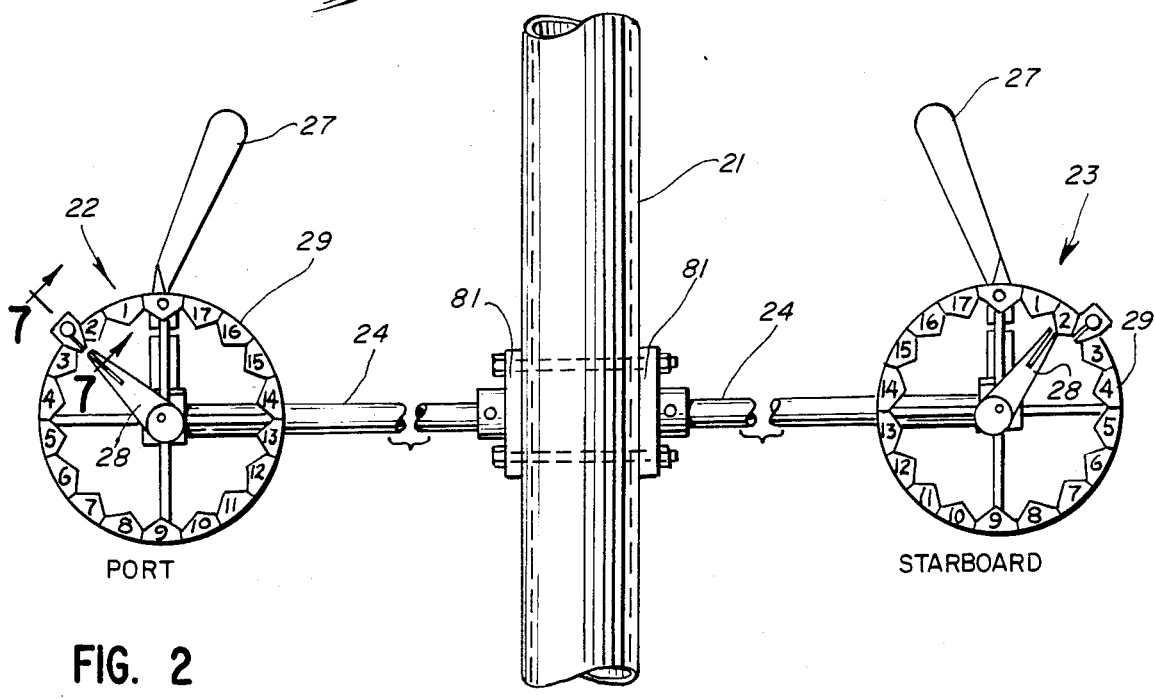
FIG. 2

FIG. 8
FIG. 9
FIG. 10
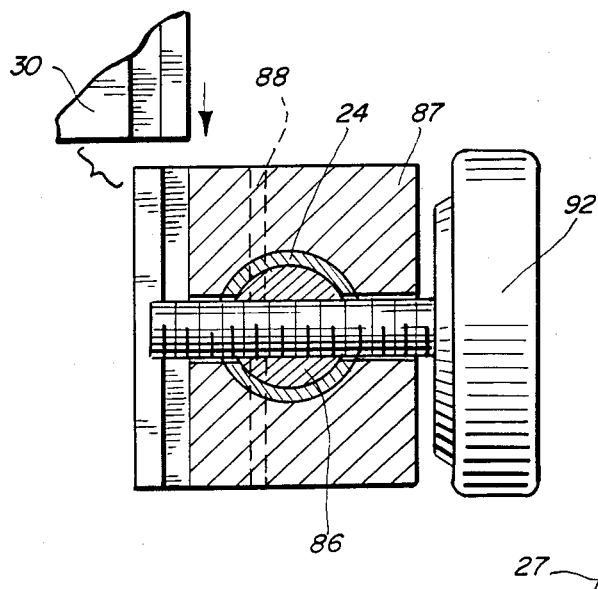
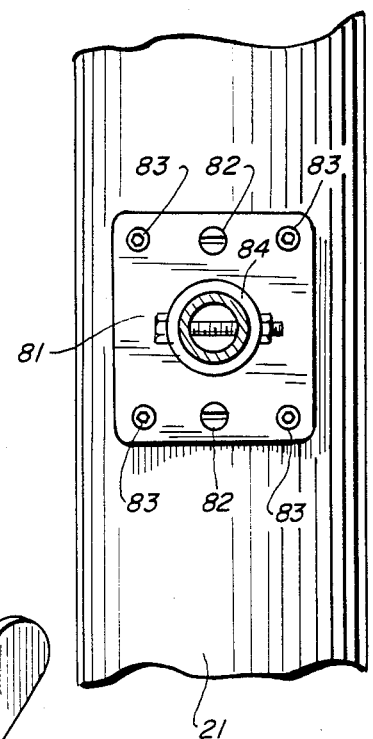
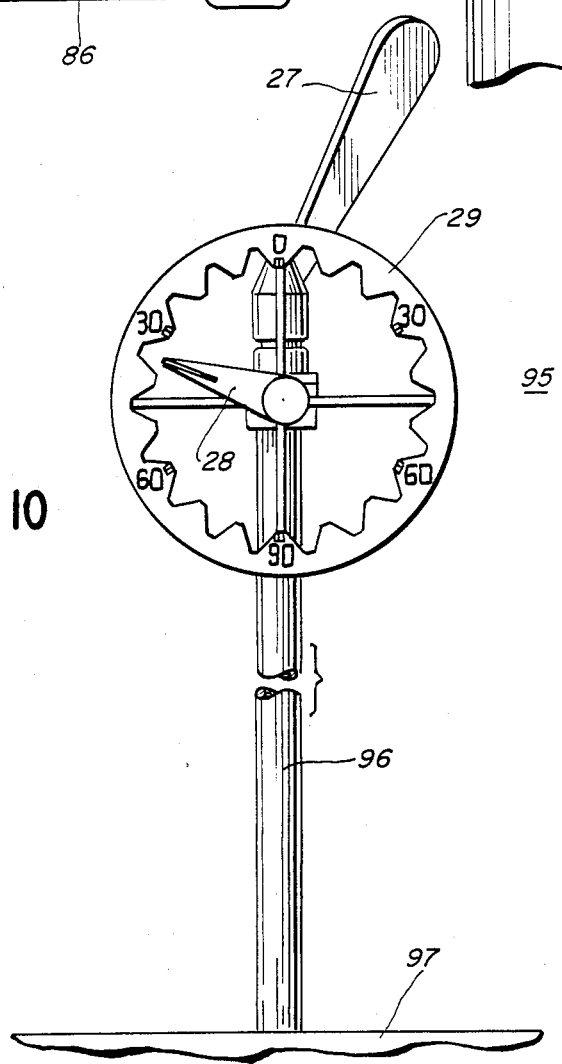

WIND INDICATOR FOR SAILBOAT

This application is a continuation of application Ser. No. 594,390, filed Mar. 28, 1984, now abandoned.

DESCRIPTION

1. Field of the Invention

This invention relates to a mechanical wind indicator for windward pointing and for reaching.

2. Background of the Invention

A wind direction indicator is an important aid in setting the proper heading of a sailboat. Wind indicators presently used range from a string telltale to a masthead wind vane with an electric repeater for the helmsman. The string does not afford a ready reference for optimum heading. The electrical system is complex, expensive and requires that the helmsman divide his attention between the repeater or indicator, which is often mounted on the cockpit bulkhead, and the sails and outside world. Moreover, the masthead wind vane often does not accurately reflect the wind direction at the center of effort of the sail area.

3. Summary of the Invention

One feature of the invention is provision of a pair of windward pointing indicators laterally spaced one on either side of the sail and above the foot of the sail, each indicator having a vane responsive to wind, a wind direction pointer coupled with the wind vane and a dial with wind direction indicia, the pointers and dials being visible to the helmsman.

Another feature is that the pointing wind indicators having identical wind vane and pointer mechanisms, each pointer being rotatable and having a circular dial associated therewith. The indicia of one dial is graduated in a clockwise direction and that of the other dial is graduated in a counterclockwise direction for operation on port and starboard tacks depending on the direction of the coupling between the shafts.

A further feature of the pointing wind indicators is that they are mounted at a height approximating the center of effort of the sail.

Yet another feature of the invention is a reaching wind indicator mounted centrally of the hull and above the deck of the sailboat, having a vane responsive to wind, a wind direction pointer coupled to the wind vane and a scale of wind direction indicia visible to the helmsman, the indicia increasing from a zero reference in both clockwise and counterclockwise directions for port and starboard reaches.

A further feature is that the wind direction indicator comprises a vertical shaft, a rotatable wind vane mounted on the vertical shaft, a horizontal shaft, a rotatable pointer mounted on the horizontal shaft, a mechanical coupling transmitting rotation of the vertical shaft to the horizontal shaft, and a circular scale of wind and direction indicia associated with the pointer. The mechanical coupling multiplies the angular movement of the wind vane to a greater angular movement of the pointer.

And another feature is that the indicator includes a body in which the shafts are journaled and which encloses the mechanical coupling between the shafts and a cage around the body to minimize fouling with the sails and lines of the sailboat.

A further feature is that a vane shaft carrier extends upwardly from the body with the vertical shaft therein extending outwardly above the carrier. A wind vane mounting hub on the shaft is loosely telescoped over the upper end of the vane shaft carrier and a water baffle is provided between the vane shaft carrier and the hub.

Another feature is that a pair of beveled gears form the mechanical coupling and the indicator includes a means for adjusting the pointer shaft axially to vary the mesh of the gears and the sensitivity of the indicator.

A further feature of the invention is a mast mount for a rod which supports the wind indicator comprising a mounting plate with a means for receiving the end of the rod, a fastener located centrally of the plate securing the plate to the mast and a plurality of adjustable bearing members on the plate engaging the surface of the mast to position the plate with respect thereto, accommodating masts of different configuration.

Further features and advantages of the invention will readily be apparent from the following specification and from the drawings.

BRIEF DESCRIPTION OF THE DRAWINGS

FIG. 1 is a perspective of a sailboat with windward pointing wind indicators mounted on either side of the mast;

FIG. 2 is an elevation of the pointing wind indicators;

FIG. 7 is a fragmentary section taken along line 7—7 of FIG. 2 illustrating the mounting of the adjustable marker on the dial;

FIG. 8 is a fragmentary section illustrating the mounting of an indicator on the support rod;

FIG. 9 is an elevation of the mast mounting plate for the support rod; and

FIG. 10 is an elevation looking aft at a reaching wind indicator mounted at the stern of the sailboat.

Figure 3:
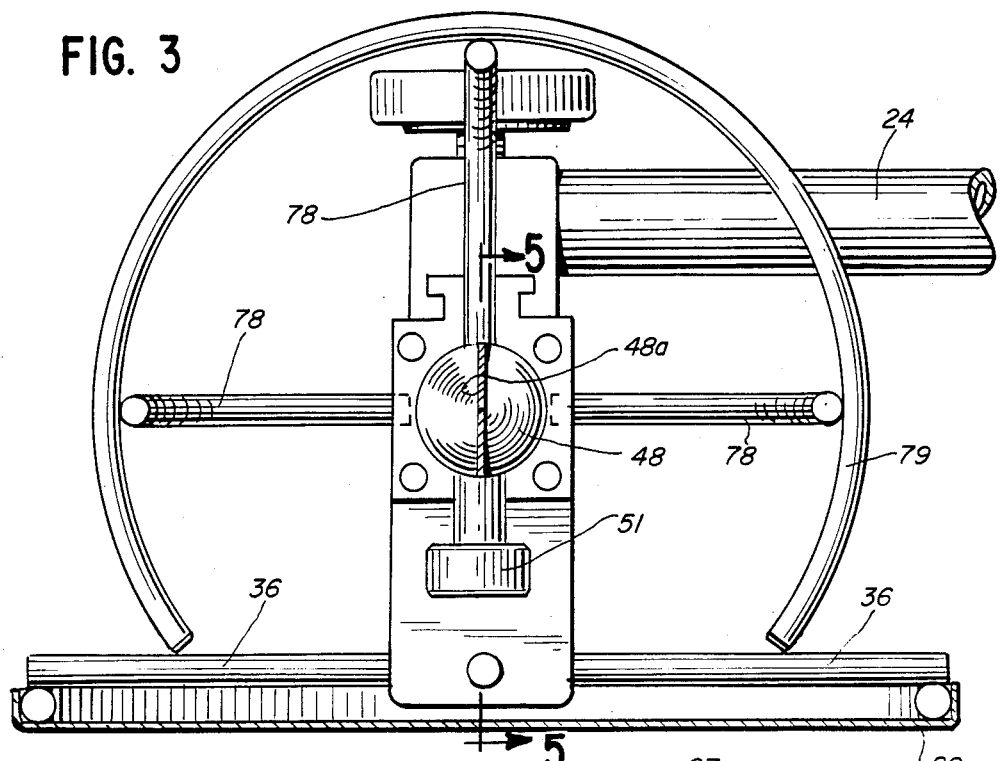
FIG. 3 is a plan view of one pointing wind indicator of FIG. 2.
Figure 4:
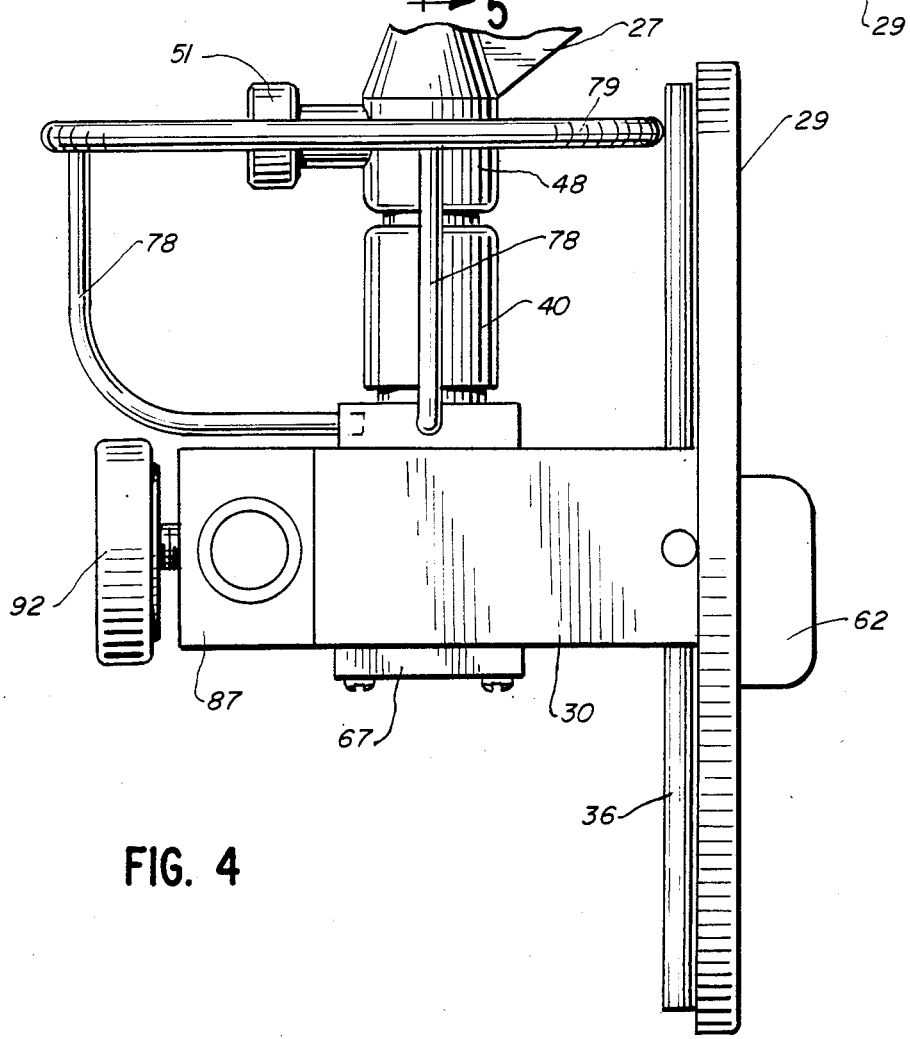
FIG. 4 is a side elevation of the pointing wind indicator of FIG. 2.

The invention as illustrated with port and starboard windward pointing wind indicators in FIG. 1 and a reaching wind indicator in FIG. 10. The wind vane and pointer mechanisms of all three indicators may be identical. The differences are in the dial indicia and in the optimum location of the indicator on the sailboat.

In FIG. 1 a sailboat has a hull 20 with a mast 21. Port and starboard windward pointing wind indicators 22, 23, respectively, are mounted on supporting rods 24 extending laterally from mast 21. The supporting rods 24 are spaced above the sailboat deck a distance sufficient to prevent interfering with movement of the crew. A height of about 7 feet is generally satisfactory. This height positions the wind indicators at about the center of effort of the typical sail on the boat with a mast height of the order of 25–30 feet, and permits the attachment and removal of the wind indicators by one standing on the deck. The wind indicators are preferably spaced laterally of the mast about 30 inches. Oscillation of the wind vane from pitch and roll of the boat is much less than with a masthead wind vane.

Each of the wind indicators has a wind responsive vane 27, a wind direction pointer 28 coupled to the vane and a dial 29 with wind direction indicia. The mounting of the windward pointing wind indicators affords good visibility for the helmsman and other members of the crew located aft of the mast.

Figures 5, 6:
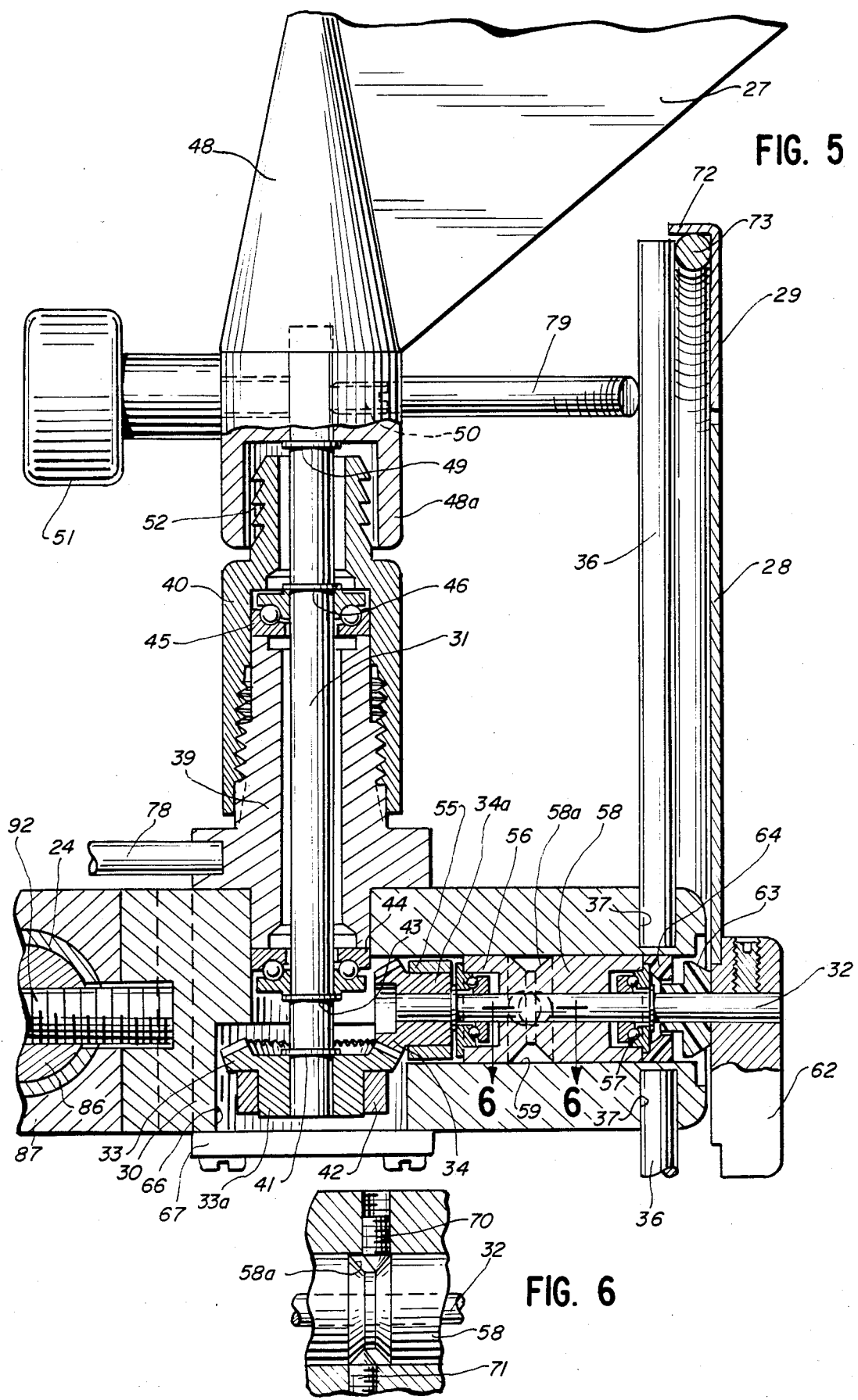
FIG. 5 is an enlarged fragmentary vertical section through the wind indicator taken along line 5—5 of FIG. 3.
FIG. 6 is a fragmentary section taken along line 6—6 of FIG. 5, showing the adjustment mechanism of the pointer shaft.

The wind direction indicator has a body 30 with a vertical shaft 31, for the wind vane 27, and a horizontal shaft 32, for the pointer 28. The shafts 31, 32 are coupled by bevel gears 33, 34, FIG. 5, transmitting rotation of the wind vane to the pointer. Dial 29 is supported by struts 36 which extend outwardly from socks 37 on body 30. The body 30 includes a carrier 39 for the vertical vane shaft 31. A cap 40 is threaded to the carrier 39.

Bevel gear 33 at the lower end of vane shaft 31 is seated against a ring 41 and has a hub 33a clamped to the shaft by a collar 42. Ring 43 on shaft 31 positions the shaft against bearing 44 which is seated on the lower end of shaft carrier 39. A second bearing 45 is seated on the upper end of carrier 39. Shaft 31 is positioned with respect to the bearing 45 by ring 46. A hub 48 on the top of shaft 31 is spaced above the upper end of cap 40 by ring 49. Wind vane 27 is secured in a slot 48a of the hub. A set screw 50 secures the hub 48 on shaft 31. A counterweight 51 diametrically opposed to wind vane 27 balances the vane assembly. Wind vane 27 extends outwardly and upwardly from hub 48 at an angle of the order of 45°.

The lower end of hub 48 is loosely telescoped over the upper end of the cap 40 of vane shaft carrier 39. The outer surface of cap 40 within the skirt 48a of the hub as annular ribs 52 thereon which act as a baffle to prevent water from reaching the interior of the mechanism.

Pointer shaft 32 has bevel gear 34 mounted at its inner end. Collar 55 surrounds gear hub 34a securing the gear to the shaft. Shaft 32 is journaled in bearings 56, 57 seated in counter bores at either end of a sleeve 58 slidable in the bore 59 through body 30. Pointer 28 and a counterweight 62 are mounted at the outer end of shaft 32.

Plug 63 mounted on shaft 32 inwardly of pointer 28 and washer 64 in the bore 59 have overlapping, complementary surfaces which define a circuitous path of the interior of the bore, minimizing the entry of water.

The opening 66 at the bottom of body 30 through which vane shaft 31 is inserted is closed by a plate 67.

The components of the wind direction indicator are of suitable corrosion resistant materials. Preferably, the body members are of anodized aluminum while the shafts and bearings are of stainless steel. Bevel gears 33, 34 are molded nylon. The wind vane 27 is a sheet of fiberglass and will bend without being permanently deformed.

The balance afforded by the counterweights and the low friction ball bearings provide an instrument which has little drag and is responsive to very light winds.

The slidable mounting of the carrier 58 for pointer shaft 32 provides for an adjustment of the mesh of bevel gears 33, 34 to eliminate binding in the gears and accommodate manufacturing tolerances in the parts. Carrier 58 has a V-shaped groove 58a in the outer surface thereof. A pair of set screws 70, 71, FIG. 6, extend into the groove and are offset axially of shaft 32. Adjustment of the screws 70, 71 moves the carrier 58 and pointer shaft 32 in the bore 59 of body 30.

The dial 29 is stamped from an aluminum plate. A flange 72 is crimped to ring 73 mounted on struts 36. Indicia on the dial indicate the boat bearing relative to the wind in degrees with the units zero omitted.

The bevel gear coupling between the wind vane and pointer shafts multiples the angular rotation of the pointer shaft to improve discrimination between small angles. In the instrument shown, the gear ratio is 2:1 and the dial has indicia from zero to 180°. The direction of the angle between the boat and the wind is different for port and starboard tacks. With the shaft coupling shown in the drawing, the dial of the port indicator is calibrated counterclockwise while that of the starboard indicator is calibrated clockwise, FIG. 2.

A marker 73 is adjustably mounted on the dial and may be positioned for the optimum pointing angle of the sailboat. The marker has a body 74 which extends around ring 73 and a clamp plate 75 overlying dial 29 and held in place by a retaining screw 76.

The helmsman in pointing into the wind will steer the boat in accordance with the pointer 28 of the windward wind indicator. The leeward wind indicator is not used. In some situations the helmsman cannot see it as it is behind the sail.

A protective cage is provided around the wind indicator to minimize the possibility of the line and sails becoming fouled. As best seen in FIGS. 2 and 3, the cage is made up of curved rods 78 extending outwardly and upwardly from the wind indicator body in vertical planes and a curved rod 79 carried by the rods 78, in a horizontal plane.

Plates 81 secured to the mast 21, FIG. 1, provide mounts for the tubular carriers 24. As illustrated in FIG. 9, the plate 81 is generally rectangular. Two centrally located fasteners 82 secure the plate to the mast. A typical sailboat mast is a thin walled extrusion, as of aluminum. The fasteners 82 extend through the mast and secure both plates 81. In the event the wind indicator is used on a boat with a wooden mast, plates 81 may be mounted with screws.

Most masts have a curved outer surface. The mounting plate 81 is fixed in position by adjustable screws 83 at each corner. The screws 83 are adjusted to engage the mast surface so that the plate is stable and substantially parallel with the center line of the boat. Mounting plate 81 has a socket 84 in which the end of tube 24 is clamped.

The wind indicators are preferably removably mounted at the ends of tubular supports 24 so that they may be stored when not in use. As illustrated in FIG. 9, a plug 86 is inserted into the tube to add strength. A mounting block 87 is secured at the end of the tube by a pin 88. The rearward face of block 87 and forward face of body 30 have complementary channel configurations so that they slide together. A retaining screw 92 clamps the wind indicator in place.

A reaching wind indicator 95 is shown in FIG. 10, mounted on a short mast 96 at the stern 97 of the sailboat. The vane 27, pointer 28 and dial 29, and the mechanism are the same as in the pointing wind indicator. Calibration of the dial, however, is different. With the 2:1 angular multiplication of the wind indicator mechanism, the dial is calibrated from zero to 90° in both the clockwise and counterclockwise directions. As shown in FIG. 10, with the boat on a starboard reach, the counterclockwise half of the dial is used. The clockwise half of the dial is used for a port reach.

I claim:

1. A pair of windward pointing wind indicators for a sailboat, laterally spaced one on either side of the sail, above the foot of the sail, each indicator having a vane responsive to wind and rotatable on a generally vertical axis, a wind direction pointer coupled with each wind vane and rotatable on an axis generally horizontal and parallel with the center line of the sailboat and a circular dial with wind direction indicia operably related with said pointer, said pointers and dials being visible to the helmsman, the indicia of the starboard dial being graduated in a clockwise direction from a zero reference with which the starbard vane is aligned when it is parallel to the sailboat centerline and the indicia of the port dial being graduated in a counterclockwise direction from a zero reference which is aligned with the port vane when it is parallel to said sail boat center line.

2. A wind direction indicator for a sailboat, mounted centrally of the hull and above the deck at the stern of the sailboat, having a vane responsive to wind and rotatable on a generally vertical axis, a wind direction pointer coupled to the wind vane and rotatable on a generally horizontal axis and a circular dial with wind direction indicia on said dial graduated about the pointer, said pointer and dial being visible to the helmsman, said indicia increasing from a zero reference with which said pointer is aligned when said vane is parallel to said sailboat centerline in both clockwise and counterclockwise directions for port and starboard wind direction ranges.

3. A wind direction indicator for a sailboat, comprising:
- a vertical shaft;
- a rotatable wind vane mounted on the vertical shaft;
- a horizontal shaft;
- a rotatable pointer mounted on the horizontal shaft;
- a mechanical coupling transmitting rotation of the vertical shaft to the horizontal shaft;
- a circular dial with wind direction indicia associated with said pointer;
- a body in which said shafts are journaled and which encloses the mechanical coupling between the shafts; and
- a cage forming a grid about said body to minimize fouling sails and lines of the sailboat with said wind direction indicator but not appreciably affecting the indication.

4. The wind direction indicator of claim 3 in which said cage comprises curved rods carried by said body in horizontal and vertical planes.

5. A wind direction indicator for a sailboat, comprising:
- a vertical shaft with a hub affixed thereto;
- a rotatable wind vane mounted on the vertical shaft and its upper and lower margins extending upwardly and laterally from said vertical shaft angularly on the order of 45°;
- a horizontal shaft;
- a rotatable pointer mounted on the horizontal shaft;
- a mechanical coupling transmitting rotation of the vertical shaft to the horizontal shaft; and
- a circular dial of wind direction indicia associated with said pointer.

6. A wind direction indicator for a sailboat, comprising:
- a vertical shaft;
- a rotatable wind vane mounted on the vertical shaft;
- a mechanical coupling transmitting rotation of the vertical shaft to the horizontal shaft;
- a circular dial of wind direction indicia associated with said pointer;
- a body enclosing said mechanical coupling;
- a vane shaft carrier extending upwardly from the body with the vertical shaft therein, the shaft extending above the carrier; and
- a wind vane mounting hub on said shaft, the wind vane extending outwardly from the hub, a skirt with internal ribs at the lower end of said hub being loosely telescoped over the upper end of said vane shaft carrier; said skirt with said ribs forming
- a water baffle between said vane shaft carrier and said hub.

7. The wind direction indicator of claim 6 in which said water baffle includes ribs extending around the outer surface of the shaft carrier, within said hub.

8. A wind direction indicator for a sailboat, comprising:
- a vertical shaft;
- a rotatable wind vane mounted on the vertical shaft;
- a horizontal shaft;
- a rotatable pointer mounted on the horizontal shaft;
- a mechanical coupling transmitting rotation of the vertical shaft to the horizontal shaft;
- a circular dial of wind direction indicia associated with said pointer;
- a body enclosing said mechanical coupling and having a horizontal bore through which said horizontal pointer shaft extends;
- a plug fitted to said horizontal shaft within said body,
- a washer in said horizontal bore having a juxtaposed, overlapping, complementary surface to a surface on said plug, and
- said surface acting as a water baffle in said horizontal bore.

9. The wind direction indicator of claim 8 in which said water baffle includes a plug on said shaft and a washer in said bone, the plug and washer having overlapping, complementary surfaces which form a circuitous path inhibiting the entry of water into the bore.

10. A wind direction indicator for a sailboat, comprising:
- a vertical shaft;
- a rotatable wind vane mounted on the vertical shaft;
- a horizontal shaft;
- a rotatable pointer mounted on the horizontal shaft;
- a body;
- a pair of bevel gears in said body forming a mechanical coupling transmitting rotation of the vertical shaft to the horizontal shaft;
- means for adjusting said pointer shaft axially in said body to vary the mesh of said gears and the responsiveness of said indicator; and
- a circular dial of wind direction indicia associated with said pointer.

11. The wind direction indicator of claim 10 in which said pointer shaft is carried by a sleeve slidably received in a bore in the body, said sleeve having a groove with a V-shaped cross-section in its outer surface; and
- a pair of screws threaded in said body and extending into said groove, the screws being offset axially of the pointer shaft so that adjustment thereof in said groove positions the sleeve and the pointer shaft in said body.

12. A mast mount for a rod which supports a wind indicator, comprising:
- a mounting plate with means for receiving an end of said rod;
- a fastener located centrally of said plate securing the plate to the mast; and
- a plurality of adjustable bearing members on said plate engaging the surface of said mast to position the plate with respect thereto.

13. The mast mount of claim 12 in which said adjustable bearing members are vertically and laterally spaced on said plate.

14. The reaching wind indicator of claim 2 in which the coupling between the vane and pointer has a one-to-two movement ratio, the indicia zero reference is at the top of the circular dial and the indicia increases to ninety degrees at the bottom of the dial, for both port and starboard wind direction ranges.

* * * * *

UNITED STATES PATENT AND TRADEMARK OFFICE
CERTIFICATE OF CORRECTION

PATENT NO.  : 4,646,567                                    Page 1 of 3
DATED       : March 3, 1987
INVENTOR(S) : CARL W. AHMER It is certified that error appears in the above-identified patent and that said Letters Patent is hereby corrected as shown below:

Col. 1, line 33,  change "having" to -- have --.

Col. 3, line 22,  change "extends" to -- has upper and lower margins which extend --;

line 27,  change "as" to -- has --;

line 28,  after "thereon" insert -- facing the inner surface of the skirt and --.

Col. 4, line 7,   after "FIG. 2" insert -- The pointers 28 are aligned with the zero reference indicia when the vanes 27 are parallel with the center line of the boat. --;

line 19,  change "the line" to -- lines --;

line 21,  after "is" insert -- a grid --;

line 56,  change "zero" to -- a zero reference --;

line 57,  after "directions." insert -- The pointer 28 is aligned with the zero reference indicia when vane 27 is parallel with the center line of the boat. --.

Col. 5, line 5,   change "starbard vane" to -- starboard pointer --;
change "it" to -- the vane --;

line 6,   change "centerline" to -- center line --;

UNITED STATES PATENT AND TRADEMARK OFFICE
CERTIFICATE OF CORRECTION

PATENT NO. : 4,646,567

DATED : March 3, 1987

INVENTOR(S) : CARL W. AHMER

It is certified that error appears in the above-identified patent and that said Letters Patent is hereby corrected as shown below:

Col. 5, line 8, after "reference" insert -- with --;
after "is" insert -- the port pointer --;
delete "with the port vane --;

line 9, change "it" to -- the vane --;
change "boat" to -- sailboat --.

Col. 5, line 20, change "centerline" to -- center line --.

Col. 5, line 37, after "fouling" insert -- of --.

Col. 6, line 3, delete "with internal ribs";

line 5, change "; said skirt and said ribs forming a water baffle between said vane shaft carrier and said hub." to -- , the skirt and carrier having facing surfaces with ribs on one of the facing surfaces forming a water baffle between said vane shaft carrier and said hub. --.

Col. 6, line 24, change "," to -- ; --;

line 28, delete paragraph;
change "surface" to -- surfaces --.

lines 32-34, delete "water baffle includes a plug on said shaft and a washer in said bone [sic], the plug and washer having overlapping, --;

line 34, delete "which".

UNITED STATES PATENT AND TRADEMARK OFFICE
CERTIFICATE OF CORRECTION

PATENT NO. : 4,646,567

DATED : March 3, 1987

INVENTOR(S) : CARL W. AHMER

It is certified that error appears in the above-identified patent and that said Letters Patent is hereby corrected as shown below:

Col. 7, line 4, delete "reaching".

Signed and Sealed this

First Day of September, 1987

Attest:

DONALD J. QUIGG

Attesting Officer

Commissioner of Patents and Trademarks